(12) United States Patent
Nakagawa

(10) Patent No.: US 11,500,392 B2
(45) Date of Patent: Nov. 15, 2022

(54) SELECTIVE DIGITAL KEY

(71) Applicant: Toyota Motor Engineering & Manufacturing North America, Inc., Plano, TX (US)

(72) Inventor: Masashi Nakagawa, Sunnyvale, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/075,798

(22) Filed: Oct. 21, 2020

(65) Prior Publication Data

US 2022/0121221 A1    Apr. 21, 2022

(51) Int. Cl.
| | |
|---|---|
| *G08G 1/16* | (2006.01) |
| *G06N 5/04* | (2006.01) |
| *G06N 20/00* | (2019.01) |
| *G08G 1/01* | (2006.01) |
| *G08G 1/09* | (2006.01) |
| *G08G 1/017* | (2006.01) |
| *G08G 1/052* | (2006.01) |
| *G08G 1/123* | (2006.01) |
| *G08G 1/005* | (2006.01) |
| *G08G 1/0967* | (2006.01) |
| *G05D 1/02* | (2020.01) |
| *G08C 17/02* | (2006.01) |
| *H04W 4/40* | (2018.01) |
| *H04W 4/029* | (2018.01) |
| *G08G 1/00* | (2006.01) |

(Continued)

(52) U.S. Cl.
CPC ......... *G05D 1/0291* (2013.01); *G05D 1/0011* (2013.01); *G06Q 30/0645* (2013.01); *G08C 17/02* (2013.01); *G08G 1/123* (2013.01); *G08G 1/22* (2013.01); *H04W 4/029* (2018.02); *H04W 4/40* (2018.02); *G08C 2201/70* (2013.01)

(58) Field of Classification Search
CPC ... G05D 1/0291; G05D 1/0011; H04W 4/029; H04W 4/40; G06Q 30/0645; G08C 17/02; G08C 2201/70; G08G 1/123; G08G 1/22
See application file for complete search history.

(56) References Cited

U.S. PATENT DOCUMENTS 5,465,299 A * 11/1995 Matsumoto ........... H04L 9/3236
713/176
6,696,981 B1 * 2/2004 Hashimoto ............ G08G 1/065
705/13

(Continued)

FOREIGN PATENT DOCUMENTS

| CN | 111340984 A | 6/2020 |
|---|---|---|
| JP | 2016208494 A | 12/2016 |
| KR | 102112394 B1 | 4/2020 |

*Primary Examiner* — Joseph H Feild
*Assistant Examiner* — Rufus C Point
(74) *Attorney, Agent, or Firm* — Dinsmore & Shohl LLP

(57) ABSTRACT

A method includes identifying a plurality of vehicles within a geographic area; transmitting a first signal to a device of a customer, the first signal being configured to control each of the plurality of vehicles; receiving a selection of a vehicle from among the plurality of vehicles; and transmitting a second signal to the device in response to receiving the selection, the second signal modifying the first signal to be disabled from controlling the plurality of vehicles except the selected vehicle.

14 Claims, 5 Drawing Sheets

(51) Int. Cl.
*G05D 1/00* (2006.01)
*G06Q 30/06* (2012.01)

(56) References Cited

U.S. PATENT DOCUMENTS

| | | | |
|---|---|---|---|
| 6,850,153 B1* | 2/2005 | Murakami | B60R 25/2018 |
| | | | 340/5.2 |
| 7,181,409 B1* | 2/2007 | Murakami | G06Q 10/02 |
| | | | 705/5 |
| 9,466,162 B2 | 10/2016 | Nakai et al. | |
| 9,635,518 B2* | 4/2017 | Lee | G07C 5/008 |
| 2003/0179076 A1* | 9/2003 | Underdahl | G07C 9/00182 |
| | | | 340/5.6 |
| 2003/0205935 A1* | 11/2003 | Flick | B60R 25/241 |
| | | | 307/10.1 |
| 2005/0231323 A1* | 10/2005 | Underdahl | B60R 25/00 |
| | | | 701/1 |
| 2006/0001523 A1* | 1/2006 | Underdahl | G05B 19/0426 |
| | | | 340/5.5 |
| 2010/0106623 A1 | 4/2010 | Menendez et al. | |
| 2011/0060480 A1* | 3/2011 | Mottla | G07C 9/00571 |
| | | | 701/2 |
| 2011/0112969 A1* | 5/2011 | Zaid | H04W 4/027 |
| | | | 701/2 |
| 2013/0082820 A1* | 4/2013 | Tieman | G07C 9/00571 |
| | | | 340/5.61 |
| 2013/0104206 A1* | 4/2013 | Waghmare | H04M 15/765 |
| | | | 726/6 |
| 2013/0317693 A1* | 11/2013 | Jefferies | B60R 25/24 |
| | | | 701/31.5 |
| 2014/0156110 A1* | 6/2014 | Ehrman | G07C 5/008 |
| | | | 701/2 |
| 2014/0156111 A1* | 6/2014 | Ehrman | G07B 15/00 |
| | | | 701/2 |
| 2014/0270172 A1* | 9/2014 | Peirce | H04L 9/0819 |
| | | | 380/270 |
| 2015/0032487 A1* | 1/2015 | Shoen | G06Q 10/02 |
| | | | 705/5 |
| 2015/0149042 A1* | 5/2015 | Cooper | B60R 25/245 |
| | | | 701/48 |
| 2016/0135054 A1* | 5/2016 | Maise | H04W 12/12 |
| | | | 713/176 |
| 2016/0352673 A1* | 12/2016 | Flores | H04L 51/52 |
| 2016/0358471 A1* | 12/2016 | Hajj | G06F 16/9038 |
| 2017/0050617 A1* | 2/2017 | Penilla | G06Q 30/0643 |
| 2017/0132533 A1* | 5/2017 | Darnell | H04L 63/061 |
| 2018/0188731 A1* | 7/2018 | Matthiesen | G01C 21/3664 |
| 2018/0194323 A1* | 7/2018 | Woodill, Jr. | G07C 9/00309 |
| 2018/0242115 A1* | 8/2018 | Kim | H04W 4/40 |
| 2019/0025856 A1* | 1/2019 | Turato | H04W 4/46 |
| 2019/0197471 A1* | 6/2019 | Endo | H04L 9/0819 |
| 2019/0311452 A1* | 10/2019 | McNabb | H04L 9/0861 |
| 2019/0385452 A1* | 12/2019 | Nangeroni | G08G 1/202 |
| 2020/0034919 A1 | 1/2020 | Qiu et al. | |
| 2020/0218893 A1* | 7/2020 | Fujisawa | G06V 10/751 |
| 2020/0320477 A1* | 10/2020 | Yoshizawa | G06Q 10/08355 |
| 2020/0380631 A1* | 12/2020 | Svitak | G08G 1/207 |
| 2021/0026345 A1* | 1/2021 | Ito | B60W 50/14 |
| 2021/0035032 A1* | 2/2021 | Foley | G06Q 30/0645 |
| 2021/0192608 A1* | 6/2021 | Buchake | G07C 9/22 |

* cited by examiner

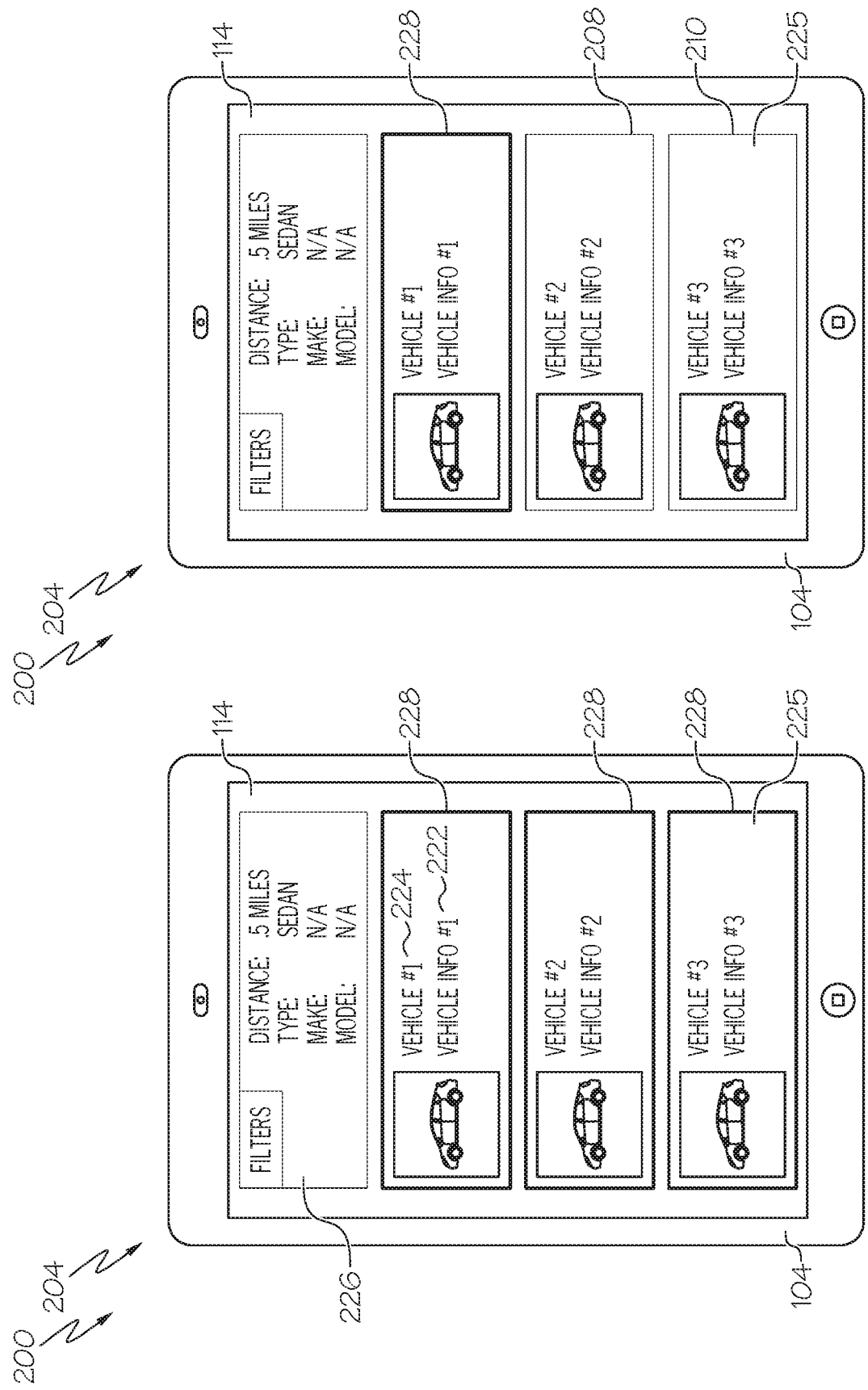

SELECTIVE DIGITAL KEY

TECHNICAL FIELD

The present specification generally relates to digital keys for accessing and operating vehicles and, more specifically, to selective digital keys for accessing and operating ride-sharing vehicles.

BACKGROUND

Car-sharing services allow customers to rent vehicles for a short duration (e.g., by the hour) and customers of a car-sharing service must be granted access to a vehicle they rent. Customers generally prefer more options and a customer may desire to choose one vehicle from several potential rental vehicles. Additionally, a customer may desire to access each vehicle from amongst the several options before making a choice in order to determine which vehicle best suits his or her purposes. However, the nature of car-sharing services may make accessing multiple potential rental vehicles with each of their respective keys impracticable. That is, vehicles used in car-sharing services tend to be geographically dispersed by the nature of their use. Because of this geographic distribution, it can be difficult or impossible for a potential customer to obtain an individual key for each of the various vehicles. A universal key may provide access to each of the vehicles in a potential rental pool, but such universal access may not be desired once a customer has made a selection of a particular rental vehicle. That is, it may be desirable to prevent access to unselected vehicles once a vehicle selection has been made. Accordingly, a selective digital key that can provide universal access to and/or control of a pool of potential rental vehicles before a vehicle is selected from the pool, but restrict access to unselected vehicles after a selection is made may be required.

SUMMARY

In one embodiment, a method includes identifying a plurality of vehicles within a geographic area; transmitting a first signal to a device of a customer, the first signal being configured to control each of the plurality of vehicles; receiving a selection of a vehicle from among the plurality of vehicles; and transmitting a second signal to the device in response to receiving the selection, the second signal modifying the first signal to be disabled from controlling the plurality of vehicles except the selected vehicle.

In another embodiment, a system includes a device configured to receive a signal; and a controller configured to cause the system to: identify a plurality of vehicles within a geographic area; transmit a first signal to a device of a customer, the first signal being configured to control each of the plurality of vehicles; receive a selection of a vehicle from among the plurality of vehicles; and transmit a second signal to the device in response to receiving the selection, the second signal modifying the first signal to be disabled from controlling the plurality of vehicles except the selected vehicle.

In yet another embodiment, a method includes identifying a plurality of vehicles within a geographic area; transmitting a first signal to a device of a customer, the first signal being configured to control each of the plurality of vehicles; receiving a deselection of one or more vehicles from among the plurality of vehicles; and transmitting a fourth signal to the device in response to receiving the deselection, the fourth signal modifying the first signal to be disabled from controlling the one or more deselected vehicles.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5A depicts a user interface for a device of the system of FIG. 1 with a plurality of potential vehicles offered for a user selection, according to one or more embodiments shown and described herein; and FIG. 5B depicts the user interface for the device of the system of FIG. 1 with one of the plurality of potential vehicles of FIG. 5A selected, according to one or more embodiments shown and described herein.

DETAILED DESCRIPTION

Car-sharing services allow customers to rent vehicles for a short duration (e.g., by the hour) and customers of a car-sharing service must be granted access to a vehicle they rent. Customers generally prefer more options and a customer may desire to choose one vehicle from several potential rental vehicles. Additionally, a customer may desire to access each vehicle from amongst the several options before making a choice in order to determine which vehicle best suits his or her purposes.

Current key systems may require a physical key and/or a fob to access and operate the vehicle. For example, a vehicle access and operation system may require a conventional physical key that can be inserted into a key slot on the door of the vehicle to mechanically unlock the door. After unlocking and opening the door the user may enter the vehicle, insert the same or a different key into the ignition, and turn the key to operate the vehicle. This system may be sufficient for users renting vehicles in the traditional sense, where, for example, a user may receive a set of keys for a single vehicle from a customer service agent and then be instructed the location of his or her vehicle.

However, the nature of car-sharing services may make accessing multiple potential rental vehicles with their own respective keys impracticable. That is, vehicles used in car-sharing services tend to be geographically dispersed, and are generally not concentrated in a specific parking lot, parking garage, or other location. Additionally, they do not tend to use an agent to distribute keys from a centralized key bank or depository. Thus, it can be difficult or impossible for a potential customer to obtain an individual key for each of the various vehicles. A universal key may provide access to each of the vehicles in a potential rental pool. However, owners of vehicles in a car-sharing service may wish to prevent access to their vehicle by users of the service who have not selected their vehicle. Accordingly, a selective digital key that can provide universal access to a pool of potential rental vehicles and then change to selectively provide access and/or control to only a selected vehicle may be required.

Figure 1:
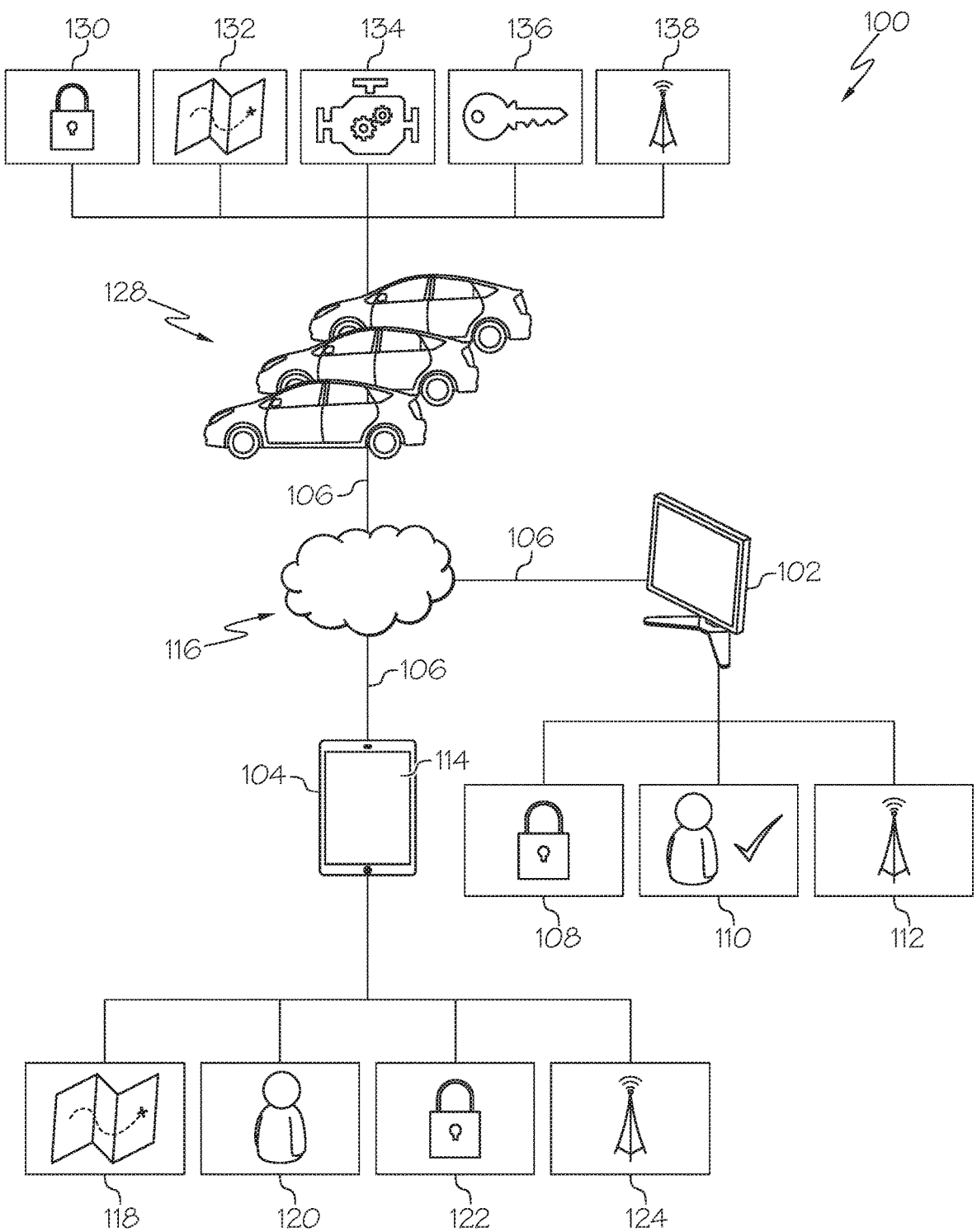
FIG. 1 schematically depicts a system for providing a user a selective digital key, according to one or more embodiments shown and described herein.

Referring now to FIG. 1, a system 100 for providing a user access to a plurality of potential rental vehicles 128 and access and control to only one of the plurality of potential rental vehicles 128 is shown. The system 100 includes a controller 102 and a device 104 that are connected by a communication path 106 that communicatively couple the controller and the device 104 to a network 116. The network 116 may be, for example, a cloud network. The controller 102 may be a remoter server, a local server, an edge device, and the like. The controller 102 includes an encryption/decryption module 108, a profile authentication module 110, and network interface hardware 112. The device 104 (e.g., a smartphone, smart key fob, or digital key) includes a mapping module 118, a profile module 120, an encryption/decryption module 122, and network interface hardware 124. The device 104 may include an interactive display 114. The system 100 may be used to access and/or control a plurality of potential rental vehicles 128 ("plurality of vehicles"). Each of the plurality of vehicles 128 may include an encryption/decryption module 130, a mapping module 132, an operational control module 134, an access control module 136, and network interface hardware 138. Each of the encryption/decryption module 108, the profile authentication module 110, the mapping module 118, the profile module 120, the encryption/decryption module 122, the encryption/decryption module 130, the mapping module 132, the operational control module 134, and the access control module 136 may be a program module in the form of operating systems, application program modules, and other program modules stored in the controller 102, the device 104, or the vehicle 128. Such a program module may include, but is not limited to, routines, subroutines, programs, objects, components, data structures and the like for performing specific tasks or executing specific data types as will be described below.

The controller 102 may include, for example, one or more processors and one or more memory modules storing one or more machine-readable instructions. The one or more processors may include any device capable of executing machine-readable instructions. Accordingly, the one or more processors may be a controller, an integrated circuit, a microchip, a computer, or any other computing device. The one or more processors and the one or more memory modules may be communicatively coupled to the other components of the system 100 by the communication path 106.

The encryption/decryption module 108 may generate a signal with a private key or a session key that creates an encrypted signal that can only be decrypted using an associated public key. Because the private key is only known by the sender, a receiver of the signal who can successfully decrypt the signal using the associated public key can be confident that the signal came from the owner of the private key, in this case, the controller 102.

Additionally, the encryption/decryption module 108 may store the public keys of the device 104 and/or each of the plurality of vehicles 128 and may decrypt received signals using the public keys of the device 104 and/or each of the plurality of vehicles 128. Because the encrypted messages received from the device 104 and each of the plurality of vehicles 128 are encrypted using their respective private keys and the private keys are held secretly, such signals cannot be decrypted by any other entity if the signals are intercepted. In some embodiments, the encryption/decryption module may decrypt signals received from the device 104 and/or the plurality of vehicles 128 with a session key once a secure or semi-secure session key has been established.

In some embodiments, the encryption/decryption module 108 may apply a hash function to a signal and sign the resulting hash, rather than signing the signal itself. In such embodiments the signed hash is transmitted along with the signal to be verified. Then, when the signal is received along with the signed hash, the signed hash may be read using the server public key and the hash function used. The results may then be compared to verify the authenticity. This method of signing only a hash of a signal rather than the entire signal may reduce data transfer, thereby increasing computational efficiency.

In the embodiments where the encryption/decryption module 108 signs hashes as discussed above, the profile authentication module 110 or another component of the system 100 may use a device public key to read a signed hash and then apply the hash function to the result to verify the sender of a message.

In some embodiments, the encryption/decryption module 108 may randomly generate or receive a randomly-generated session key to be used by the controller 102, the device 104, and the plurality of vehicles 128 to encrypt communications between them while a more secure communications protocol is established. In some embodiments, the encryption/decryption module 108 may randomly generate or receive a randomly-generated session key that is only used to encrypt messages for one communications session.

The profile authentication module 110 may verify the sender of a signal. Specifically, the profile authentication module 110 may verify that signals signed by the device 104 or individual vehicles of the plurality of vehicles 128 actually came from the device 104 or the individual vehicle of the plurality of vehicles 128. The profile authentication module 110 may accomplish this by using the public key of the respective sender to decrypt and read messages signed with the respective private key. If such messages can be successfully decrypted, then the profile authentication module 110 verifies that the message actually came from the respective sender. Further, the profile authentication module 110 may verify the integrity of a public key by, for example, reading a server key signature with the authorization public key.

The network interface hardware 112 may communicatively couple the controller 102 to the communication path 106. The network interface hardware 112 may be any device capable of transmitting and/or receiving data with external vehicles or servers directly or via a network, such as the network 116. Accordingly, network interface hardware 112 can include a communication transceiver for sending and/or receiving any wired or wireless communication. For example, the network interface hardware 112 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 112 may include hardware configured to operate in accordance with the Bluetooth wireless communication protocol and may include a Bluetooth send/receive module for sending and receiving Bluetooth communications.

The network 116 may include, for example, one or more computer networks (e.g., a personal area network, a local area network, grid computing network, wide area network, etc.), cellular networks, satellite networks and/or a global positioning system and combinations thereof. Accordingly, the controller 102, the device 104, and the plurality of vehicles 128 can be communicatively coupled to the network 116 and/or one another via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The device 104 may be, for example, a portable input/output device (e.g., a smartphone, smart key fob, or digital key fob) including an interactive display 114 (e.g., a touchscreen or tactile display). The interactive display 114 may comprise any known or yet-to-be-developed display, such as LCD, LED, plasma, OLED, CRT, projection, holographic, electronic paper, or any other type of suitable output display. If provided as a tactile display, the interactive display 114 may be any device capable of providing tactile output in the form of refreshable tactile messages. In some embodiments, the device 104 does not include a display, for example, in embodiments in which the device 104 is a display-less key fob that is capable of transmitting and receiving a signal.

The device 104 may include the mapping module 118. The mapping module 118 may include one or more components capable of determining a location of the device 104 (e.g., a global positioning system (GPS) sensor). In some embodiments, the mapping module 118 may store one or more map databases including a plurality of digital maps. The mapping module 118 may determine a location of the device 104 and may cause the location of one or more of the plurality of vehicles 128 to be displayed on a map on the interactive display 114. In some embodiments, the mapping module 118 may be used to generate walking, driving, biking, or other directions to one or more of the plurality of vehicles 128 to a user. A geographic location may be displayed on the interactive display 114, for example in pictorial form, and the geographic location may include the device 104 and the plurality of vehicles 128. The geographic location may be changed based on one or more location criteria by a user of the device 104 as will be described in greater detail herein.

The device 104 may include the profile module 120. The profile module 120 may save information on the device 104 related to a profile of a user of the device 104. In some embodiments, the profile module 120 stores a private key of the user for use with the encryption/decryption module 122. The profile module 120 may store historical data associated with a user profile such as, for example, a location history, a vehicle preference history that may include information such as, for example, a preference for a particular make, model, size, class, or other vehicle characteristics. In some embodiments, the profile module 120 may update a user profile based on information relating to a selected vehicle selected from a plurality of vehicles as described in greater detail herein. The profile module 120 may include a name, age, gender, or other classifying information associated with a user. In some embodiments, the profile module 120 may store, for example, an image of the user. The profile module 120 may store one or more credentials of a user, for example, the profile module 120 may store a driver's license number or image of a user's driver's license in order to verify that the user is licensed to operate a vehicle.

The device 104 may also include the encryption/decryption module 122. The encryption/decryption module 122 may generate a signal with a private key or a session key that creates an encrypted signal that can only be decrypted using an associated public key. Additionally, the encryption/decryption module 122 may store the public keys of the controller 102 and each of the plurality of vehicles 128 and may decrypt received signals using the public keys of the controller 102 and each of the plurality of vehicles 128. Because the encrypted messages received from the controller 102 and each of the plurality of vehicles 128 are encrypted using their respective private keys and the private keys are held secretly, such signals cannot be decrypted by any other entity if the signals are intercepted. In some embodiments, the encryption/decryption module may decrypt signals received from the controller 102 and/or the plurality of vehicles 128 with a session key once a secure or semi-secure session key has been established.

In some embodiments, the encryption/decryption module 122 may apply a hash function to a signal and sign the resulting hash, rather than signing the signal itself it. In such embodiments the signed hash will be transmitted along with the signal to be verified. Then, when the signal is received along with the signed hash, the signed hash may be read using the server public key and the hash function used. The results may then be compared to verify the authenticity. In the embodiments where the encryption/decryption module 122 signs hashes as discussed above, the profile authentication module 110 may use the public key of the controller 102 and/or one or more of the plurality of vehicles 128 to read a signed hash and then apply the hash function to the result to verify the sender of a message.

In some embodiments, the encryption/decryption module 122 may randomly generate or receive a randomly-generated session key to be used by the controller 102, the device 104, and the plurality of vehicles 128 to encrypt communications between them while a more secure communications protocol is established. In some embodiments, the encryption/decryption module 122 may randomly generate or receive a randomly-generated session key that is only used to encrypt messages for one communications session.

The network interface hardware 124 may communicatively couple the controller 102 to the communication path 106. The network interface hardware 124 may be any device capable of transmitting and/or receiving data with external vehicles or servers directly or via a network, such as the network 116. Accordingly, network interface hardware 124 can include a communication transceiver for sending and/or receiving any wired or wireless communication. For example, the network interface hardware 124 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 124 may include hardware configured to operate in accordance with the Bluetooth wireless communication protocol and may include a Bluetooth send/receive module for sending and receiving Bluetooth communications.

The plurality of vehicles 128 may include one or more vehicles in a pool of vehicles generally offered for use, for example, a customer ("user") of a car rental service (e.g., a car-sharing service). The plurality of vehicles 128 can include vehicles of any classification, make, model, size, or type. Each of the plurality of vehicles 128 may include the encryption/decryption module 130, the mapping module 132, the operational control module 134, the access control module 136, and the network interface hardware 138.

The encryption/decryption module 130 may generate or receive a signal with a private key or a session key that creates an encrypted signal that can only be decrypted using an associated public key. Additionally, the encryption/decryption module 130 may store the public keys of the device 104 and the controller 102 and may decrypt received signals using the public keys of the device 104 and the controller 102. Because the encrypted messages received from the device 104 and the controller 102 are encrypted using their respective private keys and the private keys are held secretly, such signals cannot be decrypted by any other entity if the signals are intercepted. In some embodiments, the encryption/decryption module 130 may decrypt signals received from the device 104 and/or the controller 102 with a session key once a secure or semi-secure session key has been established.

In some embodiments, the encryption/decryption module 130 may apply a hash function to a signal and sign the resulting hash, rather than signing the signal itself it. In such embodiments the signed hash will be transmitted along with the signal to be verified. Then, when the signal is received along with the signed hash, the signed hash may be read using the server public key and the hash function used. The results may then be compared to verify the authenticity.

In some embodiments, the encryption/decryption module 130 may randomly generate or receive a randomly-generated session key to be used by the controller 102, the device 104, and the plurality of vehicles 128 to encrypt communications between them while a more secure communications protocol is established. In some embodiments, the encryption/decryption module 130 may randomly generate or receive a randomly-generated session key that is only used to encrypt messages for one communications session.

Each vehicle of the plurality of vehicles 128 may include the mapping module 132. The mapping module 132 may include one or more components capable of determining a location of the vehicle (e.g., a global positioning system (GPS) sensor). In some embodiments, the mapping module 132 may store one or more map databases including a plurality of digital maps. The mapping module 132 may determine a location of the vehicle and may cause the location of one or more of the plurality of vehicles 128 to be displayed on a map on the interactive display 114.

Each vehicle of the plurality of vehicles 128 may include an operational control module 134. The operational control module 134 may provide a user with control of one or more operational functions of the vehicle. For example, the operational control module 134 may allow a user to start and/or stop an engine of the vehicle, to operate a steering wheel, to operate a GPS or other navigational feature of the vehicle, to operate a heads up display (HUD) of the vehicle, to control a velocity or an acceleration of the vehicle (e.g., using a gas pedal, a cruise control system, etc.). The operational control module 134 may provide a user operational control of a vehicle based on, for example, receipt of a digital signature from the device 104 associated with a user of the device 104 that has been approved by the controller 102.

Each vehicle of the plurality of vehicles 128 may include an access control module 136. The access control module 136 may generate and/or receive a signal that may provide a customer access to the vehicle. For example, the access control module 136 may provide a user access to one or more doors of the vehicle by pulling a handle of the door. In some embodiments, the access control module 136 may communicatively couple with a lock/unlock system of the vehicle (not shown) to lock/unlock one or more doors of the vehicle to provide a user access to the vehicle. In some embodiments, the access control module 136 may be triggered by, for example, a location of the device 104. For example, a particular vehicle may unlock and grant access to a user of the system based on the location of his or her device 104 in relation to the vehicle (i.e., within a particular proximity of the vehicle). Conversely, the vehicle may prevent access (i.e., lock or remain locked) if there is not a known and authenticated device that is permitted access to the vehicle within proximity of the vehicle.

Each of the plurality of vehicles 128 further includes network interface hardware 138. The network interface hardware 138 may communicatively couple the vehicle to the network 116 via the communication path 106. The network interface hardware 138 may be any device capable of transmitting and/or receiving data with external vehicles or servers directly or via a network, such as the network 116. Accordingly, network interface hardware 138 can include a communication transceiver for sending and/or receiving any wired or wireless communication. For example, the network interface hardware 138 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 138 may include hardware configured to operate in accordance with the Bluetooth wireless communication protocol and may include a Bluetooth send/receive module for sending and receiving Bluetooth communications.

In some embodiments, the system architecture may define a master/slave relationship between the controller 102 and the plurality of vehicles 128. That is, the controller 102 may asymmetrically control one or more processes of each of the plurality of vehicles 128 and serve as their communication hub.

Figure 2:
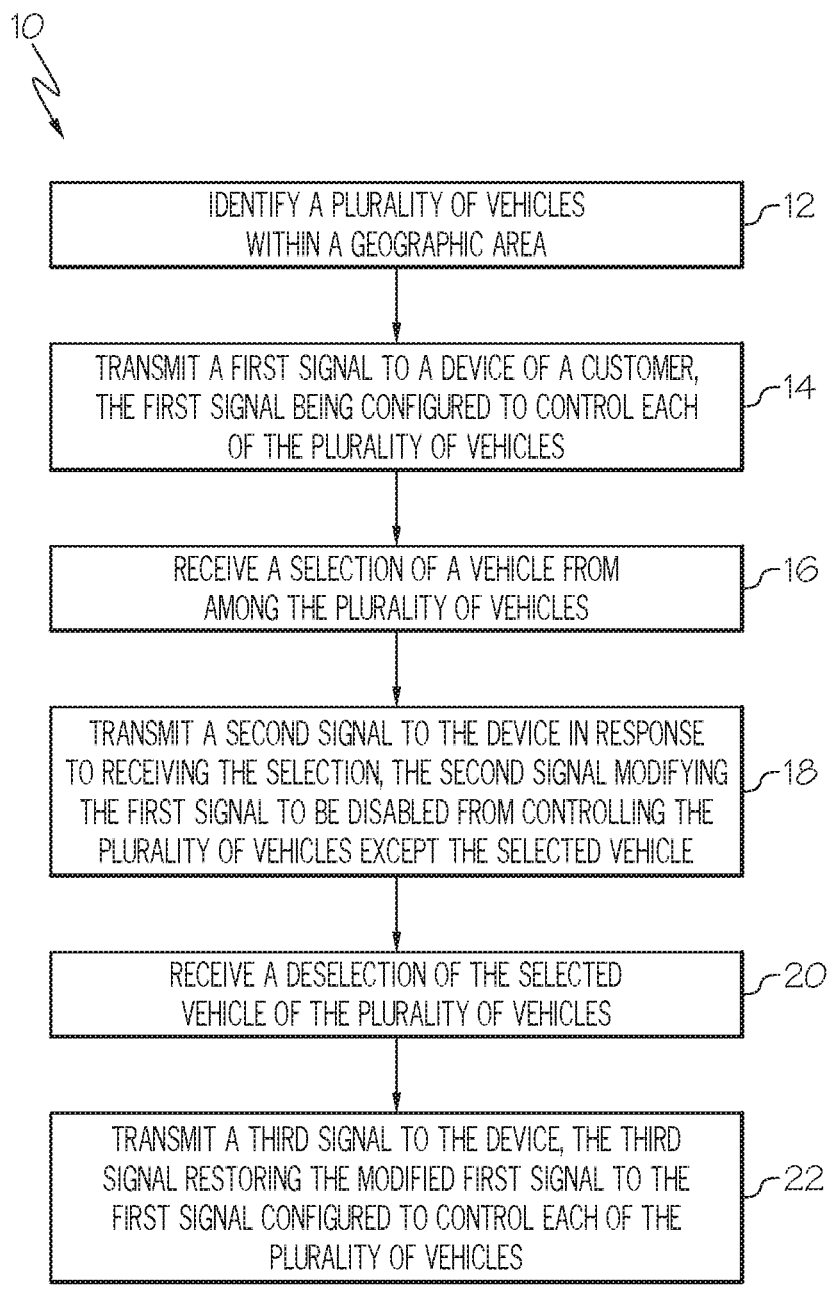
FIG. 2 depicts a method of providing selective control of a selected vehicle from amongst a plurality of vehicles, according to one or more embodiments shown and described herein.

FIG. 2 depicts a method 10 for providing selective control of a selected vehicle from amongst a plurality of vehicles. With reference to FIGS. 1 and 2, at step 12, the system 100 identifies a plurality of vehicles 128 within a geographic area. The plurality of vehicles 128 may be vehicles offered for rent by various owners in a ride-sharing or car-sharing service, for example. The geographic area may be based on, for example, a location of the device 104 or may be determined by a user (e.g., through a user input via the device 104). Each of the plurality of vehicles 128 may include components to determine their respective location and send their respective locations to the controller 102. The controller 102 may receive such location information and aggregate it and send it to the device 104 of the user. The information may be displayed to the user, for example, in a mapping application or other location-based application displayed on the interactive display 114.

As shown in step 14, the controller 102 may then transmit a first signal to the device 104 of the user and the first signal may be configured to permit the user to control each of the plurality of vehicles 128. For example, the first signal may be a digital signature that includes one or more digital signatures of the respective vehicles in the plurality of vehicles 128. The first signal may include, for example, an encrypted signal from each of the plurality of vehicles 128 that is encrypted with the private key of each of the respective vehicle. The device 104 may store the public keys of each of the plurality of vehicles 128, for example, in the encryption/decryption module 122. Control of each of the plurality of vehicles 128 may permit the user access to each of the plurality of vehicles 128. The user may access and/or control one or more of the plurality of vehicles 128 until he or she selects a vehicle. The user may relay his or her selection to the controller 102 using, for example, the device 104. In other embodiments, the user may automatically effect his or her selection by operating one of the plurality of vehicles 128. For example, the user may start the engine of one of the plurality of vehicles 128 and this may signal to the controller 102 that a selection has been made. Once he or she selects a vehicle, the controller 102 may receive the selection at step 16.

Once the controller 102 has received the selection, the controller 102 may transmit a second signal to the device 104 in response to receipt of the selection which may modify the first signal to disable the first signal from controlling the plurality of vehicles 128 except the selected vehicle at step 18. That is, the second signal may change the first signal such that the user can then only control the vehicle that he or she selected. Moreover, access to non-selected vehicles may also be prevented.

Still referring to FIGS. 1 and 2, in some embodiments, the controller 102 may be configured to receive a deselection of the selected vehicle of the plurality of vehicles 128 at step 20. For example, a user may change his or her mind regarding which vehicle to select from the plurality of vehicles 128 and may deselect a previously-selected vehicle. The user may effect deselection using, for example, the interactive display 114 of the device 104, by turning off the engine of the selected vehicle before driving, or by another means. In such case, the controller 102 may be configured to transmit a third signal to the device which may restore the modified first signal to the first signal configured to control each of the plurality of vehicles 128 as shown at step 22. Accordingly, the user may once again control each of the plurality of vehicles 128 and proceed to select one vehicle from the plurality of vehicles 128. The steps of the flowchart 10 are described in greater detail herein with respect to a specific exemplary scenario.

Figure 3:
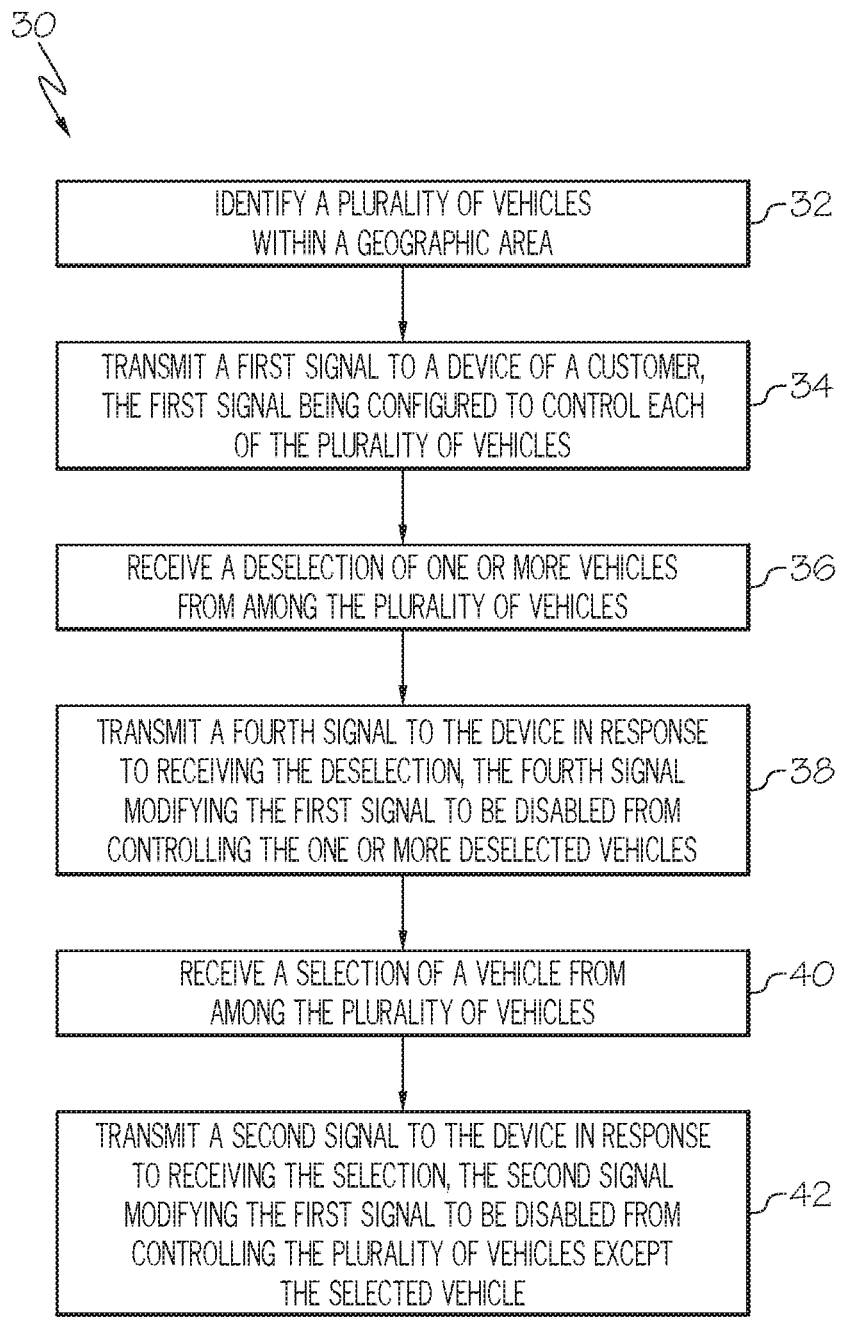
FIG. 3 depicts another method of providing selective control of a selected vehicle from amongst a plurality of vehicles, according to one or more embodiments shown and described herein.

FIG. 3 depicts the steps of a method 30 for providing selective control of a selected vehicle from amongst a plurality of vehicles. With reference to FIGS. 1 and 3, at step 32, the system 100 identifies a plurality of vehicles 128 within a geographic area. The plurality of vehicles 128 may be vehicles offered for rent by various owners in a ride-sharing or car-sharing service. The geographic location may be based on, for example, a location of the device 104 or may be determined by a user (e.g., through a user input via the device 104). Each of the plurality of vehicles 128 may include components to determine their respective location and send their respective locations to the system 100. The system 100 may receive such location information and aggregate it and send it to the device 104 of the user. The information may be displayed to the user, for example, in a mapping application or other location-based application displayed on the interactive display 114.

As shown in step 34, the controller 102 may then transmit a first signal to the device 104 of the user and the first signal may be configured to permit the user to control each of the plurality of vehicles 128. For example, the first signal may be a digital signature that includes one or more digital signatures of the respective vehicles in the plurality of vehicles 128. The first signal may include, for example, an encrypted signal from each of the plurality of vehicles 128 that is encrypted with the private key of the respective vehicle. The device 104 may store the public keys of each of the plurality of vehicles 128, for example, in the encryption/decryption module 122. Control of each of the plurality of vehicles 128 may permit the user access to each of the plurality of vehicles 128. The user may access one or more of the plurality of vehicles 128 until he or she selects a vehicle. The user may relay his or her selection to the controller 102 using, for example, the device 104. In other embodiments, the user may automatically effect his or her selection by operating one of the plurality of vehicles 128. For example, the user may start the engine of one of the plurality of vehicles 128 and this may signal to the controller 102 that a selection has been made.

Based on user preference or other factors, the user may deselect individual ones of the one or more of the plurality of vehicles 128 from among the plurality of vehicles. At step 36, the controller 102 may receive this deselection. The user may deselect vehicles using, for example, the interactive display 114 of the device 104. After the user deselects a device, the controller 102 may transmit a fourth signal to the device in response to receiving the deselection at step 38. The fourth signal may modify the first signal such that the first signal is disabled from controlling the one or more deselected vehicles of the plurality of vehicles.

Subsequently, the user may select one of the vehicles from among the plurality of vehicles 128. The user may use the interactive display 114 of the device 104, for example, to make the selection and the controller 102 may receive the selection at step 40. The system may then transmit the second signal to the device in response to receiving the selection, which may modify the first signal to be disabled from controlling the plurality of vehicles 128 except the selected vehicle. Additional details of the method 30 will be described herein.

Figure 4:
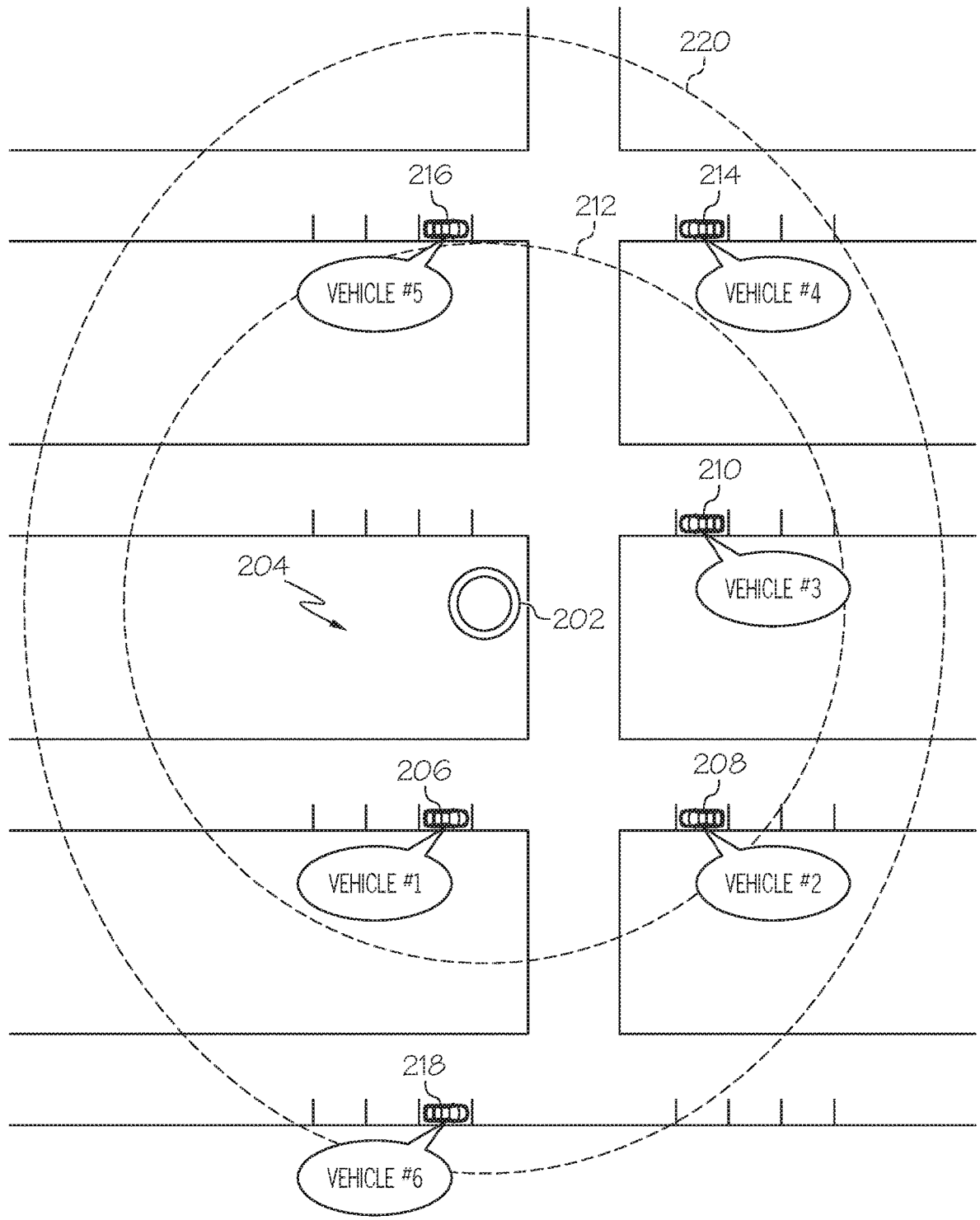
FIG. 4 depicts an application of a system for providing a user a selective digital key, according to one or more embodiments shown and described herein.

Referring to FIGS. 1 and 4, an example scenario for using the controller 102 of FIG. 1 is shown. FIG. 4 shows a rendering of an area that may be graphically depicted on a display, such as the interactive display 114 of the device 104 of FIG. 1, for example. The rendering includes a user location 202 and the locations of a plurality of vehicles 204, which may be vehicles that are available to rent using, for example, a car sharing service. The plurality of vehicles 204 includes a first vehicle 206, a second vehicle 208, and a third vehicle 210 within a geographic area 212. The plurality of vehicles 204 may further include a fourth vehicle 214, a fifth vehicle 216, and a sixth vehicle 218 inside a second geographic area 220. The geographic area 212 and the second geographic area 220 encompass a grid of streets in the pictured embodiment, but it is to be understood that embodiments are not so limited and the geographic area could be, for example, a parking lot, a parking garage, or other place where vehicles are operated or parked. Additionally, in the depicted embodiment, the geographic area 212 and the second geographic area 220 center on the user location 202 and the geographic area 212 and the second geographic area 220 are based on the device location. However, embodiments are not so limited. In some embodiments, the geographic area 212 and the second geographic area 220 may be affected by a user input (i.e., a user-input location), may be affected by one or more area adjustment criteria, or may be affected based upon a vehicle cluster location where a sufficient number of vehicles or a sufficient vehicle density occurs to provide a user sufficient choice of vehicles.

The controller 102 may generate or alter various geographic areas dynamically based on one or more factors. For example, the geographic area may move with a user as he or she travels with the device 104. As the location of the device changes, so may the area of available rental cars and the list of available vehicles may automatically update in real time. In some embodiments, the location, size, or shape of the geographic area 212 may be based on a location of vehicles. For example, a user may set one or more settings of the controller 102 such that any search for available rental vehicles returns at least three vehicles (or any other number of vehicles as determined by the user). The location, size, or shape of the geographic area 212 may be adjusted such that it encompasses vehicles accordingly. In some embodiments, a user may input a location using the device 104 around which to focus the geographic area 212, for example, by touching an interactive display 114 of the device 104 in a location on an interactive map displayed by the mapping module 118. The location input may serve as a user-input location that is a basis for defining the geographic area 212.

In some embodiments, the size of the geographic area 212 may be dynamically adjusted based on a user input. For example, the user may determine that none of the vehicles in a particular geographic area suit his or her purposes and may increase a radius or other dimension of the geographic area. In some embodiments, the size of the geographic area 212 may be based on a density of available vehicles in the particular area. That is, if there aren't sufficient options for the customer to choose from, the geographic area may automatically expand to include more vehicles. For example, the size of the geographic area 212 may expand to the size of the second geographic area 220. Conversely, if there is an abundance of vehicles such that the customer may be exhausted from choice the size of the geographic area may decrease.

Referring now to FIGS. 1, 5A, and 5B, further details of the exemplary aspect of the system of FIG. 1 are shown. FIG. 5A shows the interactive display 114 of the device 104 depicting vehicles that are available for rent within the geographic area 212 of FIG. 4. The available vehicles may be filtered, for example, by one or more filters 226. The available filtered vehicles in FIGS. 5A and 5B include a plurality of vehicles 204 including a first vehicle 206, a second vehicle 208, and a third vehicle 210. Each of vehicles includes a vehicle descriptor 224 and vehicle information 222. The vehicle descriptor 224 may be, for example, a name assigned to the vehicle (e.g., "Red Sedan" or "Vehicle #1"). The name may be a generally descriptive nomination of the particular vehicle that is assigned by an owner of the vehicle or the user, generated by the system 100, or otherwise assigned to the vehicle. The vehicle information 222 may include further descriptive information about the vehicle, for example, the class, make, model, type, size, or other information about the vehicle.

In FIG. 5A, each of the first vehicle 206, the second vehicle 208, and the third vehicle 210 is highlighted by a selection indication 228. The selection indication 228 indicates to a user that a particular vehicle is accessible or controllable by the user and that the user may access and/or control that vehicle in order to determine whether to select or deselect the vehicle.

With reference to FIGS. 1, 5A, and 5B, when a vehicle is accessible by a user of the system 100, it may be unlocked to the user. That is, the system 100 may cause a first signal to be sent to the first vehicle 206, the second vehicle 208, and the third vehicle 210 that cause them to permit access to the user. For example, the access control module 136 may unlock one or more doors or a trunk or tailgate of the vehicle. The first signal may be, for example, a digital signature that may be encrypted and decrypted by one or more of the encryption/decryption module 108 and the encryption/decryption module 122.

The user may then access one or more of the vehicles. For example, a user may access the first vehicle 206. If the user determines that he or she does not prefer the first vehicle 206, one or more of the second vehicle 208 and the third vehicle 210 may be accessed. The user may access the second vehicle 208 and/or the third vehicle 210 and make a selection. If the user determines that he or she prefers the first vehicle 206 over the second vehicle 208 or third vehicle 210, he or she may return to the first vehicle 206.

Access to the plurality of vehicles 204 may be effected in various ways. For example, the first vehicle 206 may unlock when a user is within a certain proximity of the first vehicle 206 as determined, for example, by the mapping module 118 of the device 104 and the mapping module 132 of the particular vehicle. In other embodiments, a user may have access to a graphical user interface (GUI) that may include one or more buttons for unlocking or locking a vehicle. The GUI may be rendered, for example, as an interface on the interactive display 114 of the device 104. The user may access the first vehicle 206 and determine whether or not he or she prefers to rent the first vehicle 206. The user may similarly access each of the second vehicle 208 and the third vehicle 210 to determine whether he or she prefers the second vehicle 208 or the third vehicle 210.

The user may make a vehicle selection, for example, by touching one of the vehicle selectors on the interactive display 114 of the device 104. As shown in FIG. 5B, the first vehicle 206 is the selected vehicle as indicated by the highlighted selector of the first vehicle 206. The device 104 may cause the selection to be sent to the controller 102. Accordingly, the controller 102 may receive the selection of a vehicle from among the plurality of vehicles 204.

Once the selection is received, the controller 102 may transmit a second signal to the device 104 in response to receiving the selection. The second signal may modify the first signal such that the user cannot control any of the plurality of vehicles 204 except the selected vehicle as described herein. For example, the system may modify the first signal such that the digital signatures required to access the second vehicle 208 and the third vehicle 210 are not included in the first signal. Thus, the operational control module 134 of the first vehicle 206 may permit the user to operate the control systems of the first vehicle 206 (e.g., engine, steering, brakes, etc.) but the engine control modules of the second vehicle 208 and the third vehicle 210 may not allow the user to operate the control system of these vehicles, respectively.

In some embodiments, the controller 102 may be capable of restoring a user's access to one or more vehicles that have not been selected by the user. For example, the controller 102 may receive a deselection of a selected vehicle from the plurality of vehicles and may transmit a third signal to the device based on receiving the deselection. The third signal may restore the modified first signal to the first signal configured to access and/or control each of the plurality of vehicles. As discussed herein, the first signal may be a digital signature and the second signal may modify the digital signature. The third signal may restore the modified digital signature to the digital signature that was configured to access and/or control each of the plurality of vehicles before the modification.

In some embodiments, the user may be capable of filtering the plurality of vehicles 204 based on one or more vehicle criteria. For example, the user may be able to filter the plurality of vehicles 204 based on one or more filter criteria that may include, for example, a size, type, vehicle make, vehicle model, number of available seats, year model, rental price, vehicle class, or other criteria of the vehicle. The plurality of vehicles 204 may be filtered to better suit a user's preferences for vehicles. In some embodiments, the filter criteria may automatically filter based on, for example, a user history of preferred vehicles.

It should now be understood that a universal selective key may provide access to each of the vehicles in a potential rental pool while selectively preventing access to one or more vehicles within the pool. The universal selective key may be digital and may be based on one or more secure communications with a controller that may be remotely connected with the key (e.g., a smart device, smart key fob, or digital key fob) and the one or more vehicles. Accordingly, a user can control and/or access a number of vehicles in a pool, select a vehicle from the pool, access and control the vehicle, and be prevented access and/or control to other vehicles that have not been selected.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
identifying a plurality of vehicles within a geographic area;
transmitting a first signal to a device of a customer, the first signal being configured to control each of the plurality of vehicles, and the first signal including a digital signature;
receiving a selection of a vehicle from among the plurality of vehicles;
transmitting a second signal to the device in response to receiving the selection, the second signal modifying the first signal to be disabled from controlling the plurality of vehicles except the selected vehicle, the second signal modifying the digital signature;
receiving a deselection of the selected vehicle of the plurality of vehicles; and
transmitting a third signal to the device, the third signal restoring the first signal that is modified to the first signal configured to control each of the plurality of vehicles.

2. The method of claim 1, further comprising filtering the plurality of vehicles based on one or more filter criteria such that the first signal allows access to a filtered subset of the plurality of vehicles.

3. The method of claim 2, wherein the one or more filter criteria comprises one or more of a user input, a user history, a vehicle class, a vehicle make, a vehicle model, a rental price, and a number of seats available within each of the plurality of vehicles.

4. The method of claim 1, wherein a location of the geographic area is based upon one or more location criteria that include one or more of a device location, a user-input location, and a vehicle cluster location.

5. The method of claim 1, wherein the geographic area is dynamically adjustable based upon one or more of a device location, a location of each of the plurality of vehicles, and a user-input location.

6. The method of claim 1, wherein a size of the geographic area is dynamically adjustable based upon one or more area adjustment criteria that include one or more of a user input or a density of available vehicles.

7. The method of claim 1, further comprising updating a user profile based on the selected vehicle.

8. A system comprising:
a device configured to receive a signal; and
a controller configured to:
identify a plurality of vehicles within a geographic area,
transmit a first signal to the device of a customer, the first signal being configured to control each of the plurality of vehicles, the first signal including a digital signature;
receive a selection of a vehicle from among the plurality of vehicles;
transmit a second signal to the device in response to receiving the selection, the second signal modifying the first signal to be disabled from controlling the plurality of vehicles except the selected vehicle, the second signal modifying the digital signature;
receive a deselection of the selected vehicle of the plurality of vehicles; and
transmit a third signal to the device, the third signal restoring the first signal that is modified to the first signal configured to control each of the plurality of vehicles.

9. The system of claim 8, wherein the device is a smartphone.

10. The system of claim 8, the controller further configured to filter the plurality of vehicles based on one or more filter criteria such that the first signal allows access to a filtered subset of the plurality of vehicles.

11. The system of claim 10, wherein the one or more filter criteria comprises one or more of a user input, a user history, a vehicle class, a vehicle make, a vehicle model, a rental price, and a number of seats available within each of the plurality of vehicles.

12. The system of claim 8, wherein a location of the geographic area is based upon one or more location criteria that include one or more of a device location, a user-input location, and a vehicle cluster location.

13. The system of claim 8, wherein a size of the geographic area is dynamically adjustable based upon one or more area adjustment criteria that include one or more of a user input and a density of available vehicles.

14. A method comprising:

identifying a plurality of vehicles within a geographic area;

transmitting a first signal to a device of a customer, the first signal being configured to control each of the plurality of vehicles;

receiving a selection of a vehicle from among the plurality of vehicles;

transmitting a second signal to the device in response to receiving the selection, the second signal modifying the first signal to be disabled from controlling the plurality of vehicles except the vehicle that is selected;

receiving a deselection of the selected vehicle from among the plurality of vehicles; and transmitting a third signal to the device, the third signal restoring the first signal that is modified to the first signal configured to control each of the plurality of vehicles.

* * * * *